US012562598B2

(12) United States Patent
Wobak et al.

(10) Patent No.: US 12,562,598 B2
(45) Date of Patent: Feb. 24, 2026

(54) METHOD FOR CHARGING A DEPLETED BATTERY OF A WIRELESS CHARGING DEVICE AND A WIRELESS CHARGING DEVICE THEREFOR

(71) Applicant: NXP B.V., Eindhoven (NL)

(72) Inventors: Markus Wobak, Graz (AT); Ulrich Neffe, Albersdorf-Prebuch (AT)

(73) Assignee: NXP B.V., Eindhoven (NL)

( * ) Notice: Subject to any disclaimer, the term of this patent is extended or adjusted under 35 U.S.C. 154(b) by 619 days.

(21) Appl. No.: 18/164,935

(22) Filed: Feb. 6, 2023

(65) Prior Publication Data

US 2024/0266843 A1 Aug. 8, 2024

(51) Int. Cl.
*H02J 50/20* (2016.01)
*H02J 7/00* (2006.01)
*H04W 4/80* (2018.01)

(52) U.S. Cl.
CPC .......... *H02J 50/20* (2016.02); *H02J 7/00045* (2020.01); *H04W 4/80* (2018.02)

(58) Field of Classification Search
CPC ..................................................... H02J 50/20
USPC ...................................................... 320/108
See application file for complete search history.

(56) References Cited

U.S. PATENT DOCUMENTS

| | | | |
|---|---|---|---|
| 2003/0017804 A1* | 1/2003 | Heinrich | G06K 19/0723 |
| | | | 455/42 |
| 2011/0248673 A1* | 10/2011 | Aerts | H02J 7/0044 |
| | | | 320/108 |
| 2014/0368050 A1 | 12/2014 | Chun et al. | |
| 2017/0366232 A1 | 12/2017 | Lee et al. | |
| 2018/0131218 A1 | 5/2018 | Shellhammer et al. | |
| 2018/0241255 A1* | 8/2018 | Leabman | H04B 1/04 |
| 2020/0119586 A1 | 4/2020 | Russo et al. | |
| 2022/0102995 A1* | 3/2022 | Fieldbinder | H02J 7/00036 |

FOREIGN PATENT DOCUMENTS

| | | | | |
|---|---|---|---|---|
| CN | 111937273 A | * | 11/2020 | H04B 17/29 |
| EP | 3157126 A1 | | 4/2017 | |
| EP | 2203966 B1 | | 9/2019 | |
| EP | 4050807 A1 | | 8/2022 | |
| KR | 102098832 B1 | | 4/2020 | |
| TW | 201103024 A | | 1/2011 | |

* cited by examiner

*Primary Examiner* — Jerry D Robbins

(57) ABSTRACT

A method for charging a fully depleted battery of a wireless charging (WLC) device is provided. An RF controller and a read-only non-volatile memory of the WLC device is powered with the RF field of a WLC charger device. The RF controller controls charging of the battery by the RF field using a first charging program stored in the read-only non-volatile memory. A microcontroller of the WLC device is booted up after the battery has reached a predetermined voltage level. The microcontroller loads a second more complex dynamic charging program into a volatile random-access memory (RAM) of the WLC device for execution by the RF controller. The RF controller transitions code execution from the first charging program in the read-only non-volatile memory to the second charging program in the RAM. In another embodiment, the WLC device is provided.

20 Claims, 4 Drawing Sheets

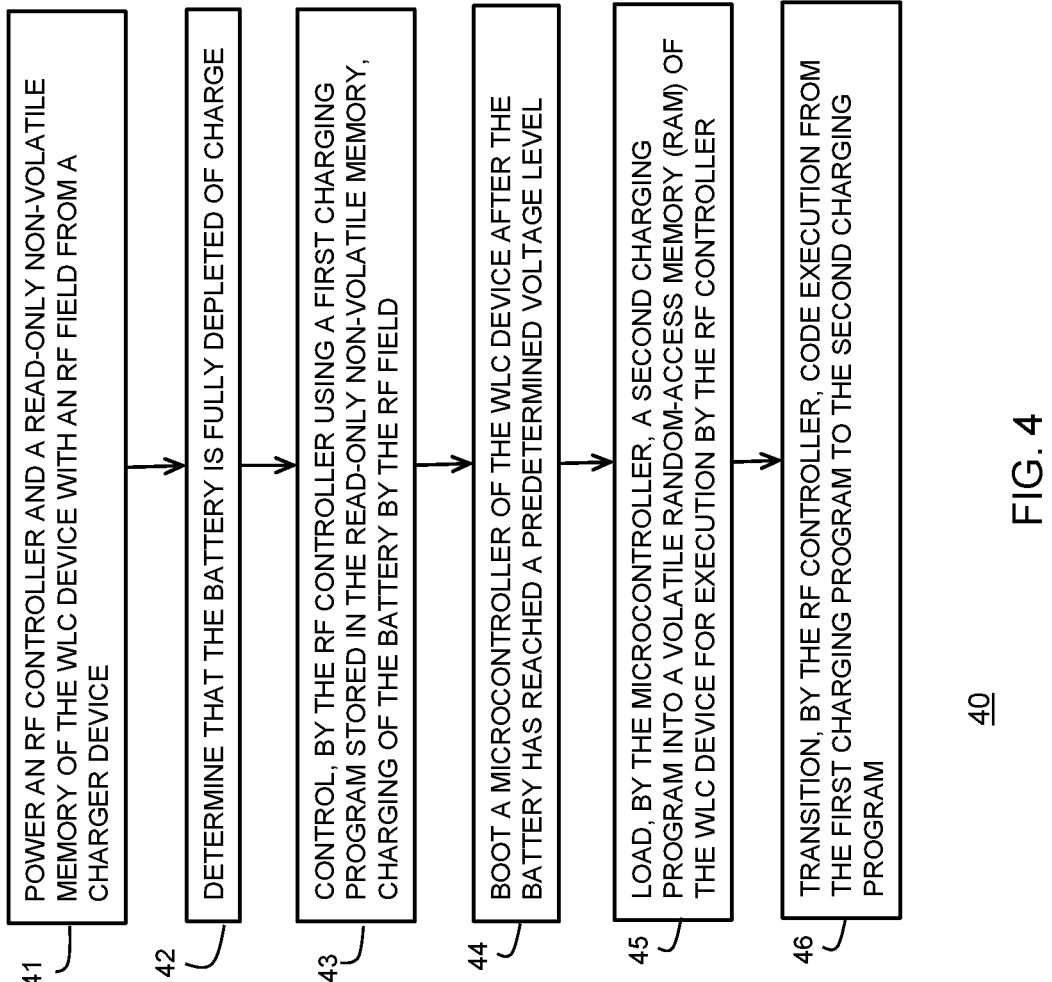

41 — POWER AN RF CONTROLLER AND A READ-ONLY NON-VOLATILE MEMORY OF THE WLC DEVICE WITH AN RF FIELD FROM A CHARGER DEVICE

42 — DETERMINE THAT THE BATTERY IS FULLY DEPLETED OF CHARGE

43 — CONTROL, BY THE RF CONTROLLER USING A FIRST CHARGING PROGRAM STORED IN THE READ-ONLY NON-VOLATILE MEMORY, CHARGING OF THE BATTERY BY THE RF FIELD

44 — BOOT A MICROCONTROLLER OF THE WLC DEVICE AFTER THE BATTERY HAS REACHED A PREDETERMINED VOLTAGE LEVEL

45 — LOAD, BY THE MICROCONTROLLER, A SECOND CHARGING PROGRAM INTO A VOLATILE RANDOM-ACCESS MEMORY (RAM) OF THE WLC DEVICE FOR EXECUTION BY THE RF CONTROLLER

46 — TRANSITION, BY THE RF CONTROLLER, CODE EXECUTION FROM THE FIRST CHARGING PROGRAM TO THE SECOND CHARGING PROGRAM

METHOD FOR CHARGING A DEPLETED BATTERY OF A WIRELESS CHARGING DEVICE AND A WIRELESS CHARGING DEVICE THEREFOR

BACKGROUND

Field

This disclosure relates generally to electronic circuits, and more particularly, to a method for charging a depleted battery of a wireless charging device and a wireless charging device therefor.

RELATED ART

The use of wireless energy harvesting based on radio frequency (RF) technology is becoming more widely used to power electronic devices and to charge batteries. Example devices include near field communication (NFC) and radio frequency identification (RFID) devices. Wireless charging using NFC is useful for charging small accessories. Small accessories include, for example, wearables, human interface devices, and audio devices. Implementations can follow the NFC Forum Wireless Charging (WLC) specification, or a system based on legacy NFC communication schemes.

Small battery powered accessories may be wirelessly charged using NFC wireless charging at 13.56 megahertz (MHz). Such devices may feature a RF receiver unit with a central processing unit (CPU) running a computer program to control charging operations (e.g., power negotiations via an RF communications link). This computer program can be executed from read/write non-volatile memory such as flash memory or electrically erasable programmable read only memory (EEPROM). Because the computer program is stored in a non-volatile memory wireless charging can occur when the battery is completely depleted.

However, the process technology for manufacturing an integrated circuit may not allow the integration of read/write non-volatile memory into a wireless charging receiver. Many power negotiation algorithms may be specific to the charging device. Without a non-volatile memory, the device specific algorithms have to be loaded from, e.g., a system level processor into the wireless charging volatile memory during a boot process of the processor. However, if the battery that powers the system is fully depleted, the external system cannot be powered and as a result the charging algorithms cannot be loaded, thus preventing charging of the fully depleted battery.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 4 illustrates flowchart of a method for wirelessly charging a fully depleted battery of a WLC device in accordance with an embodiment.

DETAILED DESCRIPTION

Figure 1:
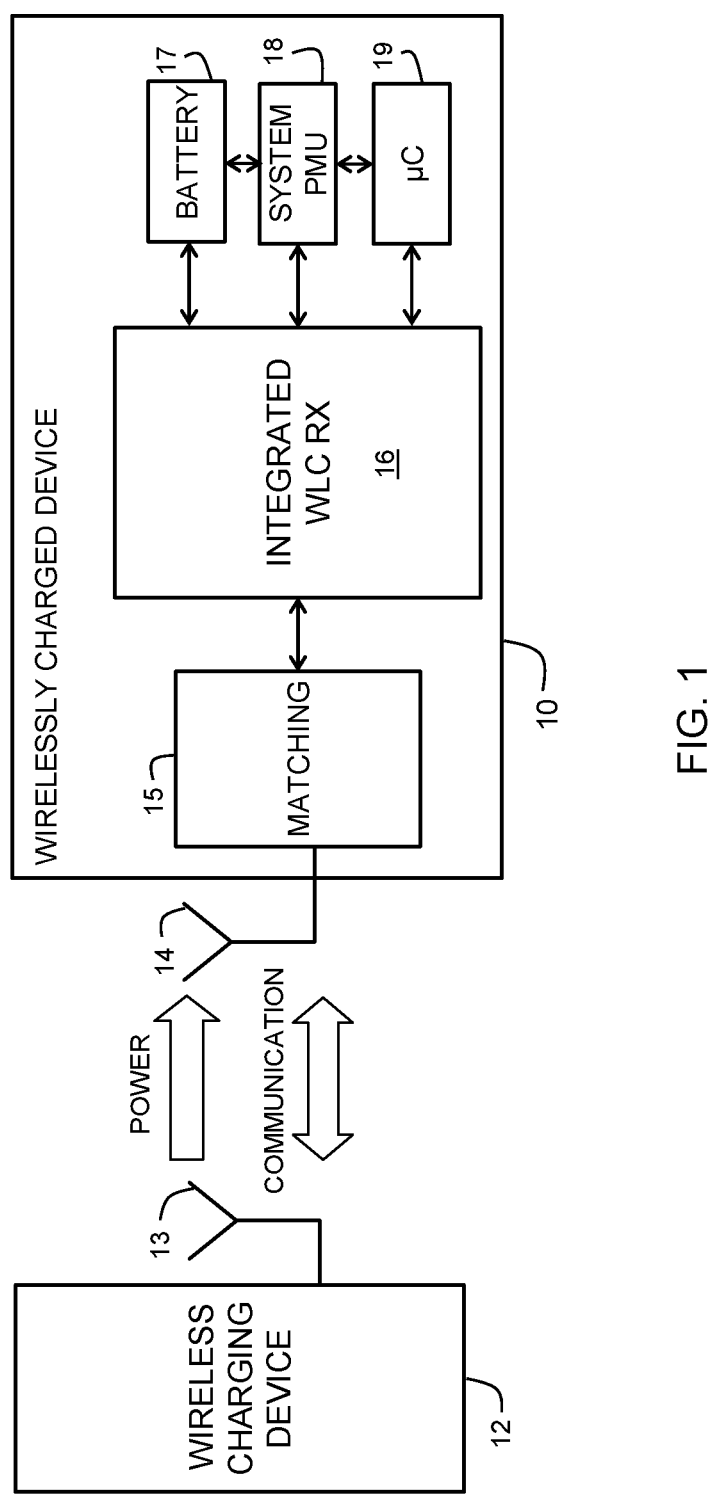
FIG. 1 illustrates a WLC device in close proximity to a WLC charger device in accordance with an embodiment.

Generally, there is provided, a method to recover a battery powered wirelessly charged device from completely depleted battery state. The wirelessly charged device includes an RF controller that executes a computer program using a generated RF field for power. The RF controller autonomously interacts with an RF charger for recovery of the depleted battery by executing a relatively simple static charging program from read-only non-volatile memory such as, e.g., a one-time programmable (OTP) memory or read only memory (ROM). When the battery is sufficiently recovered, a system microcontroller can boot and load a more complex dynamic charging computer program to the RF controller's volatile memory, such as a random access memory (RAM), using a wired interface between the microcontroller and the RF controller without interrupting the ongoing wireless RF charging activity. The method provides a relatively seamless transition of program execution from the static charging program to the dynamic charging program during the RF charging activity.

In one embodiment, the disclosed method provides for wireless RF charging for WLC devices such as small accessories, e.g., a stylus for a pad computer or ear buds. In one embodiment, the RF power transmission and RF communication use a carrier frequency of 13.56 megahertz (MHz).

In accordance with an embodiment, there is provided, a method for charging a fully depleted battery of a wireless charging (WLC) device, the method including: exposing the WLC device to a radio frequency (RF) field generated by a WLC charger device; powering an RF controller and a read-only non-volatile memory of the WLC device with the RF field; controlling, by the RF controller using a first charging program stored in the read-only non-volatile memory, charging of the battery by the RF field; enabling a microcontroller of the WLC device after the battery has reached a predetermined voltage level; loading, by the microcontroller, a second charging program into a volatile random-access memory (RAM) of the WLC device for execution by the RF controller; and transitioning, by the RF controller, code execution from the first charging program to the second charging program. The first charging program may control a static power transfer of the WLC device. The second charging program may control a negotiated wireless power transfer for dynamically controlling a wireless charging power transfer. The read-only non-volatile memory may be one of either a one-time programmable (OTP) memory or a read only memory (ROM). The RF field is provided according to a near field communication (NFC) protocol. An RF communication link may be used to identify the WLC device as a wirelessly chargeable device to enable the charging of the battery by the RF field. Transitioning code execution from the first charging algorithm to the second charging algorithm may further include receiving an indication that the second charging program is available in the RAM and transitioning the RF controller from executing the first charging program to executing the second charging program while charging the battery. Receiving the indication that the second charging program is available in the RAM may further include the microcontroller sending a communication to the RF controller indicating that the second charging program was successfully loaded in the RAM. Receiving the indication that the second charging program is available in the RAM may further include the RF controller scanning RAM contents for a specific bit pattern at a predetermined memory address, and in response to detecting the specific bit pattern, transitioning program execution to the second charging program.

In another embodiment, there is provided, a method for wirelessly charging a fully depleted battery of a wireless charging (WLC) device, the method including: exposing the WLC device to a radio frequency (RF) field generated by a WLC charger device; powering a RF controller and a read-only non-volatile memory of the WLC device with the RF field; determining, by the RF controller that the battery is fully depleted of charge; detecting, by the RF controller, an RF communication link with the WLC charger device that identifies the WLC device to the charging device as a device that can be wirelessly charged; controlling, by the RF controller, charging of the battery by the RF field using a first charging program stored in the read-only non-volatile memory; booting a microcontroller of the WLC device after a battery voltage is at a predetermined voltage level; loading, by the microcontroller, a second charging program into a volatile random access memory (RAM) of the WLC device for execution by the RF controller; and transitioning, by the RF controller, code execution from the first charging program to the second charging program in response to receiving an indication that the second charging program has been successfully loaded in the RAM, wherein the transitioning occurs without interrupting charging of the battery. The device may be implemented on one or more integrated circuits. The RF field may be provided according to a near field communication (NFC) protocol. Receiving the indication that the second charging program has been successfully loaded in the RAM may further include the microcontroller sending a communication to the RF controller indicating that the second charging program was successfully loaded in the RAM. Receiving the indication that the second charging program has been successfully loaded in the RAM may further include the RF controller scanning RAM contents for a specific bit pattern at a predetermined memory address, and in response to detecting the specific bit pattern, transitioning program execution to the second charging program.

In yet another embodiment, there is provided, a wireless charging (WLC) device including: a power receiver coupled to an antenna of the WLC device to receive an RF field from a WLC charging device, and configured to convert the RF field to a DC voltage for charging a battery; a radio frequency (RF) controller coupled to control charging of the battery, wherein in response to the RF controller determining that the battery is fully depleted, executing a first charging program stored in a read-only non-volatile memory using only power generated from the RF field; and a microcontroller configured to upload a second charging program to a random access memory (RAM) in response to the battery being charged to a predetermined voltage level, wherein the RF controller switches program execution from the first charging program to the second charging program in response to an indication that the second charging program is available in RAM. The first charging algorithm may control a static power transfer of the WLC device, and wherein the second charging algorithm may control a negotiated wireless power transfer for dynamically controlling a wireless charging power transfer. The read-only non-volatile memory may be one of a one-time programmable memory (OTP) or a read only memory (ROM). The RF field may be provided according to a near field communication (NFC) protocol. The RF controller may receive the indication that the second charging program is available in the RAM when the microcontroller sends a communication to the RF controller indicating that the second charging program was successfully loaded in the RAM. The RF controller may receive the indication that the second charging program is available in the RAM in response to the RF controller detecting a specific bit pattern in the RAM.

In normal operation, a WLC device's battery has enough charge for a microprocessor to be supplied with power from the battery through the system power management unit (PMU). After starting up, the WLC device can load a volatile memory with a computer program to perform a wireless charging operation. This may include at least procedures to respond to an RF link establishment with a wireless charger. The RF link is triggered by the wireless charger and wireless charging specific algorithms of the WLC device to control battery charging of the WLC device. This may include power transfer negotiations with the wireless charger. However, when the battery is depleted, the computer program used to control the wireless charging operation is lost from the volatile memory. A procedure and device are provided for recovering the battery charge when the battery of a WLC device lacking a read/write non-volatile memory is fully depleted.

FIG. 1 illustrates WLC device 10 in close proximity with WLC charger device 12 in accordance with an embodiment. WLC device 10 includes antenna 14, matching circuit 15, integrated WLC receiver (RX) 16, battery 17, system power management unit (PMU) 18, and microcontroller 19. Wireless charger device 12 includes antenna 13 to power and communicate with wirelessly charged device 10 via antenna 14. A two-way communication scheme is used to identify WLC device 10 to WLC charger device 12 and to negotiate a wireless power charging state. Antenna 14 is connected to integrated WLC receiver 16 via matching circuit 15. Matching circuit 15 provides impedance matching between antenna 14 and integrated WLC RX 16, and may be implemented using a network of resistors, inductors and capacitors. Note that there may be additional circuits in WLC device 10 that are not shown in FIG. 1.

WLC device 10 further includes system power management unit (PMU) 18 for supplying battery power from battery 17 to integrated WLC RX 16 and microcontroller (μC) 19 when the battery is charged. If battery 17 is depleted and cannot supply power to WLC device 10, integrated WLC RX 16 is configured to receive and use power from an RF field received via antenna 14 from antenna 13 of wireless charging device 12. WLC RX 16 controls charging of battery 17 while being powered by the RF field using a first charging program stored in a read only non-volatile memory such as OTP 25. The first charging program is a simple program for controlling static charging of battery 17. When provided with sufficient power, microcontroller 19 communicates with RF controller 24 using a wired interface 28 (FIG. 2) such as I²C, SPI, or UART. During operation when battery 17 is not depleted, microcontroller 19 loads a second computer to RAM 26 using interface 28 in FIG. 2 and RF controller 24 uses the second computer program to control a more complex negotiated charging. The second computer program may be received from another memory (not shown), or downloaded from WLC charger device 12.

Figure 2:
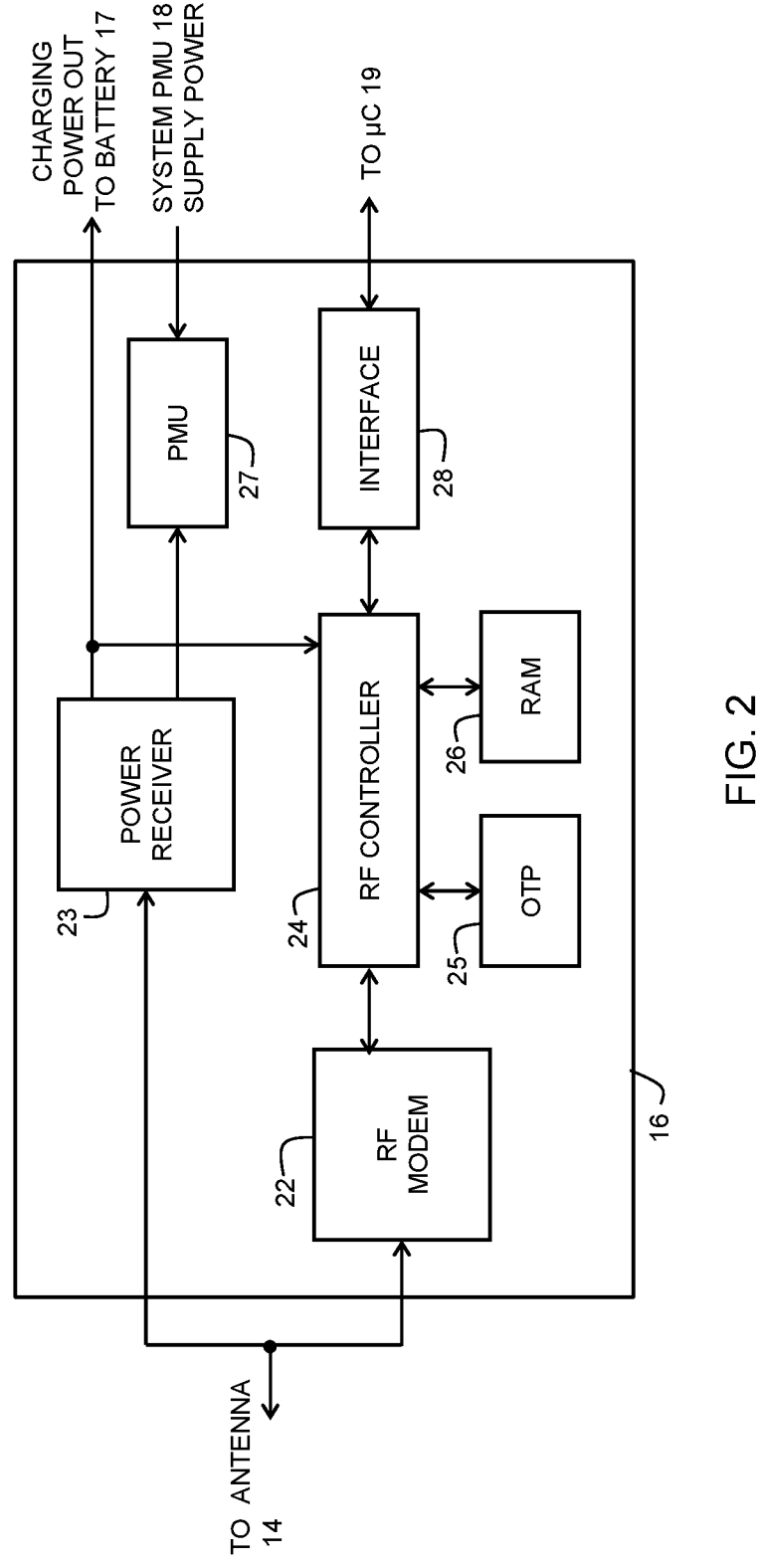
FIG. 2 illustrates the integrated WLC receiver of FIG. 1 in more detail.

FIG. 2 illustrates integrated WLC receiver 16 of FIG. 1 in more detail. WLC receiver 16 includes RF modem 22, power receiver 23, RF controller 24, OTP 25, RAM 26, PMU 27, and interface 28. Power receiver 23 performs battery charging of battery 17 using power supplied by an RF field received via matching circuit 15 and antenna 14. For NFC wireless charging, power receiver 23 includes a rectifier to perform an AC to DC conversion, and a low drop out regulator or a DC/DC converter to perform battery charging. For NFC, charging may be from a magnetic RF field at 13.56 MHz. RF controller 24 may be implemented using a central processing unit (CPU) and is used to communicate using a wireless RF link to WLC charger device 12 and to control a battery charging operating point. RF controller 24 allows WLC charger 12 to perform link establishment and to identify WLC device 10 as a wirelessly charged device. Note that for charging systems based on the NFC Forum WLC, charger device 12 (also called a WLC Poller) has to distinguish between a NFC wirelessly charged device (also called WLC Listener) and legacy NFC Listener devices that do not support wireless charging such as NFC tags, smart cards, transit tickets or access cards. Those devices only require short RF transactions. WLC charger 12 will keep its RF field enabled only if WLC device 10 is identified as a wirelessly charged device during link establishment using RF in-band communication. Thus, in the case of a completely depleted battery and if the wirelessly charged device is not correctly identified as a wirelessly charged device, insufficient charging will be provided and the dead battery will not be recovered due to a too short enabled RF cycle (short charging cycle). Therefore, when battery 17 is dead, or depleted, RF controller 24 boots using power from the RF field and executes a first computer program including a simple static charging algorithm stored in OTP 25. OTP memory 25 may be another type of read only non-voltage memory such as a ROM. Note that OTP memory 25 may be initialized with the first computer program during a production stage of WLC device 10 for providing a basic charging and communication functionality.

An integrated circuit process technology used for manufacturing might not allow the integration of read/write non-volatile memory into WLC device 10 that is implemented on a single integrated circuit. Generally, WLC devices for different customers use device specific power negotiation algorithms. Programming a ROM or OTP memory for each customer would add additional cost and complexity to the manufacturing process. Also, using a separate integrated circuit for a read/write non-volatile memory would add additional cost.

In an embodiment, the computer program includes link establishment with the wireless charger that allows identification of WLC device 10 as a wirelessly charged device. Establishing the identity of a wirelessly chargeable device is important to ensure that the wireless charger device keeps its RF field enabled to perform wireless charging even when the battery is fully discharged or dead. After a voltage of battery 17 had reached a predetermined voltage level, microcontroller 19 is able to boot up and operate, and then loads a second computer program to RAM 26 using a wired interface 28 shown in FIG. 2. RF controller 24 uses the second computer program to control a more complex negotiated power transfer method to charge battery 17. Microcontroller 19 may transfer the second computer program from an external memory (not shown), or the second computer program may be downloaded via a wireless communication from WLC charger device 12.

After switching charging of battery 17 to the second computer program, integrated WLC receiver 16 can be used to receive and transmit RF frames according to an RF specification like, e.g., the NFC Forum using wireless communications to RF modem 22 and wired communication using interface 28 to microprocessor 19.

Figure 3:
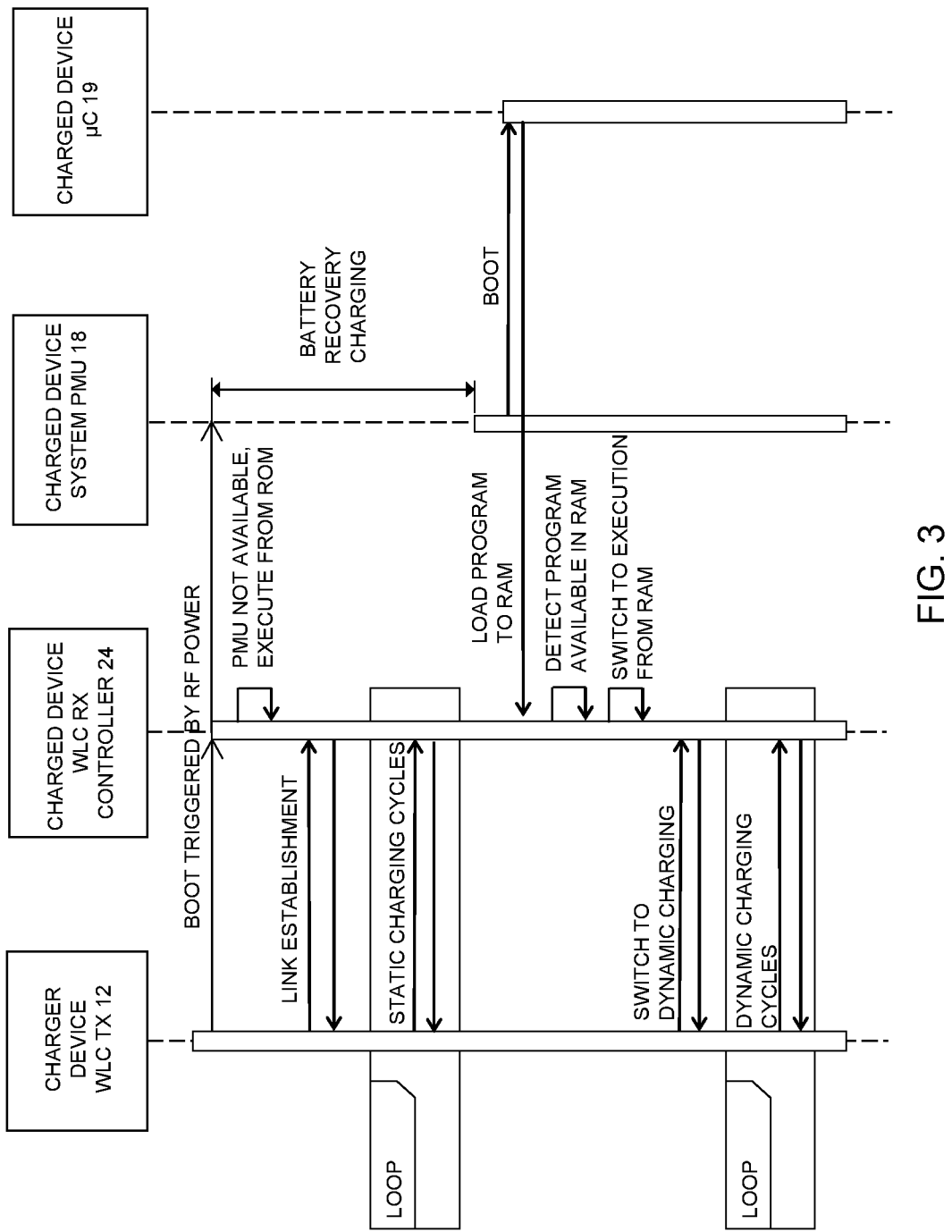
FIG. 3 illustrates a sequence diagram of a method for wirelessly charging a fully depleted battery of a WLC device according to an embodiment.

FIG. 3 illustrates a sequence diagram of a method for wirelessly charging a fully depleted battery of WLC device 10 according to an embodiment. Initially, in this example, wirelessly charged device 10 has a depleted battery. Thus, RAM 26 of WLC controller 24 is not initialized and μC 19 is not in an operative state. Once charger device 12 enables its RF field because, for example, WLC device 10 has been detected, WLC RX controller 24 is supplied with power from RF field and will boot up and operate. This power is also used to start battery recovery charging. WLC controller 24 detects the dead battery state because it is not being supplied from battery 17 (or PMU 18) or not having an initialized RAM 26. Thus, WLC controller 24 executes a first computer program stored in read-only non-volatile memory. The first computer program may perform only basic static wireless power transfer. This allows WLC charger 12 to perform link establishment, to identify WLC device 10 as a wirelessly chargeable device and to enter a program loop of static charging. Identifying that WLC device 10 is a wirelessly chargeable device ensures that WLC charger 12 does not stop providing the RF field and end recovery of battery 17.

As soon as battery 17 is sufficiently charged, μC 19 can boot and initialize RAM 26 of WLC RX controller 24 via wired interface 28. An implementation based on NFC Forum Wireless Charging Specification may implement static wireless power transfer of the first computer program to recover the dead battery. Once the more complex second computer program is loaded to RAM 26, WLC device 10 can request transition into negotiated wireless power transfer by setting a charging mode to enter dynamic wireless charging and using device specific algorithms. It may take time, such as from a few seconds to a few minutes until battery 17 is charged enough so that μC 19 is supplied with enough power to begin operation. Note that the amount of time may depend on industrial design and application. Once operating, μC 19 begins loading the second more complex second computer program into RAM 26. Next, WLC RX controller 24 identifies recovery from the depleted battery state by monitoring battery voltage (or power supply from PMU) and detecting an initialized RAM 26 containing the valid second computer program. Detection of the second computer program available in RAM 26 can be done by the first computer program in WLC RX controller's read-only non-volatile memory, e.g., OTP 25. To detect the second computer program is available, the first computer program can recurringly check for availability of the second computer program at defined time periods, for example, when no RF communication is allowed according to the RF charging protocol specification such as defined by the NFC Forum WLC Specification. One way to identify a loaded program in RAM 26 is to send a specific host interface command or to write a control register inside RF controller 24 via host interface 28 to signal that RAM 26 was updated with the second computer program, which is checked by the first computer program in OTP 25 recurringly. Another way to detect a program is loaded in RAM 26 is that the first computer program in OTP 25 scans RAM 26 contents on a recurring basis. A specific pattern (e.g., data values at pre-defined memory addresses) can be defined and detected indicating availability of an advanced computer program. Another way to detect the second computer program is loaded is for WLC controller 24 to check RAM 26 contents against a cyclic redundancy check (CRC) computed over RAM 26 with a value provided by microcontroller 19. Once WLC controller 24 has identified a valid computer program in RAM 26, WLC controller 24 switches execution from the first computer program in OTP 25 to the second computer program in RAM 26. The second computer program may be set to transition into a program loop of dynamic charging cycles, e.g., to negotiate required optimum RF power to further charge battery 17.

Switching execution from the first static charging computer program stored in OTP 25 to the second extended computer program stored in RAM 26 to perform more advanced dynamic charging is performed during ongoing charging activity. RF controller 24 transitions code execution from the first computer program to the second computer program without interrupting ongoing RF wireless charging activity. Thus, no RF field, RF communication, or system reset is required and dead battery recovery handling is transparent for charger device 12. Transitioning from static to dynamic charging cycles can be done in response to WLC device 10 indicating support for dynamic charging as part of an RF communication with WLC charger device 12. As a result, WLC charger device 12 can end static charging and begin dynamic charging that uses a negotiated wireless power transfer charging operation. The negotiated wireless power transfer will enable a higher efficient power charging cycle compared to a static wireless power transfer.

The described method to recover a dead battery using OTP 25 and RAM 26 allows the use of high-voltage manufacturing process technologies not compatible with read/write non-volatile memory such as flash and EEPROM. Additionally, complex charging negotiation algorithms may be in place in the computer program which may require updates from time-to-time. This method provides the ability to update the computer program as needed without interrupting device operation.

FIG. 4 illustrates a flowchart of method 40 for wirelessly charging a fully depleted battery of a WLC device in accordance with an embodiment. The WLC device is exposed to, or placed in the proximity of, an RF field of a WLC charger device. Method 40 begins at block 41. At block 41, an RF controller of the WLC device is powered by the RF field of the WLC charger device. At block 42, the RF controller determines that the battery is fully depleted of charge and cannot be used to provide power. At block 43, the RF controller controls charging of the battery by the RF field using a first charging program stored in read-only non-volatile memory. At block 44, after the battery has been sufficiently charged, a microcontroller of the WLC device is able to boot. At block 45, the microcontroller loads a second charging program into a volatile random access memory of the WLC device for execution by the RF controller. At block 46, the RF controller of the WLC device transitions execution from the first charging program to the second charging program. Operation of the WLC device can then proceed with normal application processing.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A method for charging a fully depleted battery of a wireless charging (WLC) device, the method comprising:
   exposing the WLC device to a radio frequency (RF) field generated by a WLC charger device;
   powering an RF controller and a read-only non-volatile memory of the WLC device with the RF field;
   controlling, by the RF controller using a first charging program stored in the read-only non-volatile memory, charging of the battery by the RF field;
   enabling a microcontroller of the WLC device after the battery has reached a predetermined voltage level;
   loading, by the microcontroller, a second charging program into a volatile random-access memory (RAM) of the WLC device for execution by the RF controller; and
   transitioning, by the RF controller, code execution from the first charging program to the second charging program.

2. The method of claim 1, wherein the first charging program controls a static power transfer of the WLC device.

3. The method of claim 1, wherein the second charging program controls a negotiated wireless power transfer for dynamically controlling a wireless charging power transfer.

4. The method of claim 1, wherein the read-only non-volatile memory is one of either a one-time programmable (OTP) memory or a read only memory (ROM).

5. The method of claim 1, wherein the RF field is provided according to a near field communication (NFC) protocol.

6. The method of claim 1, wherein an RF communication link is used identify the WLC device as a wirelessly chargeable device to enable the charging of the battery by the RF field.

7. The method of claim 1, wherein transitioning code execution from the first charging algorithm to the second charging algorithm further comprises receiving an indication that the second charging program is available in the RAM and transitioning the RF controller from executing the first charging program to executing the second charging program while charging the battery.

8. The method of claim 7, wherein receiving the indication that the second charging program is available in the RAM further comprises the microcontroller sending a communication to the RF controller indicating that the second charging program was successfully loaded in the RAM.

9. The method of claim 7, wherein receiving the indication that the second charging program is available in the RAM further comprises the RF controller scanning RAM contents for a specific bit pattern at a predetermined memory address, and in response to detecting the specific bit pattern, transitioning program execution to the second charging program.

10. A method for wirelessly charging a fully depleted battery of a wireless charging (WLC) device, the method comprising:

exposing the WLC device to a radio frequency (RF) field generated by a WLC charger device;

powering a RF controller and a read-only non-volatile memory of the WLC device with the RF field;

determining, by the RF controller that the battery is fully depleted of charge;

detecting, by the RF controller, an RF communication link with the WLC charger device that identifies the WLC device to the charging device as a device that can be wirelessly charged;

controlling, by the RF controller, charging of the battery by the RF field using a first charging program stored in the read-only non-volatile memory;

booting a microcontroller of the WLC device after a battery voltage is at a predetermined voltage level;

loading, by the microcontroller, a second charging program into a volatile random access memory (RAM) of the WLC device for execution by the RF controller; and transitioning, by the RF controller, code execution from the first charging program to the second charging program in response to receiving an indication that the second charging program has been successfully loaded in the RAM, wherein the transitioning occurs without interrupting charging of the battery.

11. The method of claim 10, wherein the device is implemented on one or more integrated circuits.

12. The method of claim 10, wherein the RF field is provided according to a near field communication (NFC) protocol.

13. The method of claim 10, wherein receiving the indication that the second charging program has been successfully loaded in the RAM further comprises the microcontroller sending a communication to the RF controller indicating that the second charging program was successfully loaded in the RAM.

14. The WLC listener method of claim 10, wherein receiving the indication that the second charging program has been successfully loaded in the RAM further comprises the RF controller scanning RAM contents for a specific bit pattern at a predetermined memory address, and in response to detecting the specific bit pattern, transitioning program execution to the second charging program.

15. A wireless charging (WLC) device comprising:

a power receiver coupled to an antenna of the WLC device to receive an RF field from a WLC charging device, and configured to convert the RF field to a DC voltage for charging a battery;

a radio frequency (RF) controller coupled to control charging of the battery, wherein in response to the RF controller determining that the battery is fully depleted, executing a first charging program stored in a read-only non-volatile memory using only power generated from the RF field; and a microcontroller configured to upload a second charging program to a random access memory (RAM) in response to the battery being charged to a predetermined voltage level, wherein the RF controller switches program execution from the first charging program to the second charging program in response to an indication that the second charging program is available in RAM.

16. The WLC device of claim 15, wherein the first charging algorithm controls a static power transfer of the WLC device, and wherein the second charging algorithm controls a negotiated wireless power transfer for dynamically controlling a wireless charging power transfer.

17. The WLC device of claim 15, wherein the read-only non-volatile memory is one of a one-time programmable (OTP) memory or a read only memory (ROM).

18. The WLC device of claim 15, wherein the RF field is provided according to a near field communication (NFC) protocol.

19. The WLC device of claim 15, wherein the RF controller receives the indication that the second charging program is available in the RAM when the microcontroller sends a communication to the RF controller indicating that the second charging program was successfully loaded in the RAM.

20. The WLC device of claim 15, wherein the RF controller receives the indication that the second charging program is available in the RAM in response to the RF controller detecting a specific bit pattern in the RAM.

* * * * *